United States Patent
Geiberger et al.

(10) Patent No.: US 6,595,077 B1
(45) Date of Patent: *Jul. 22, 2003

(54) GEAR WHEEL VARIABLE TRANSMISSION WITH TWO SUB-GEARS ARRANGED PARALLEL TO EACH OTHER IN THE POWER FLOW

(75) Inventors: Axel Geiberger, Fellbach (DE); Markus Heizel, Donzdorf (DE); Andreas Kolb, Wernau (DE); Ralf Sperber, Wendlingen (DE); Heinrich Straub, Stuttgart (DE); Guenter Woerner, Kernen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/869,095

(22) PCT Filed: Dec. 21, 1999

(86) PCT No.: PCT/EP99/10240

§ 371 (c)(1),
(2), (4) Date: Sep. 28, 2001

(87) PCT Pub. No.: WO00/39484

PCT Pub. Date: Jul. 6, 2000

(30) Foreign Application Priority Data

Dec. 24, 1998 (DE) .......................................... 198 60 250
Apr. 24, 1999 (DE) .......................................... 199 18 732

(51) Int. Cl.[7] ................................................. F16H 3/08
(52) U.S. Cl. ............................. 74/330; 74/329; 74/333; 74/31
(58) Field of Search ......................... 74/329, 330, 331, 74/333

(56) References Cited

U.S. PATENT DOCUMENTS

| | | | |
|---|---|---|---|
| 3,817,123 A | 6/1974 | Whateley et al. | |
| 4,658,663 A | 4/1987 | Hiraiwa | |
| 4,823,628 A | 4/1989 | Hiraiwa | |
| 6,209,406 B1 * | 4/2001 | Sperber et al. | .............. 74/330 |

FOREIGN PATENT DOCUMENTS

| | | |
|---|---|---|
| DE | 3131139 | 9/1985 |
| DE | 3546454 | 2/1987 |
| DE | 3812327 | 6/1989 |
| DE | 4240762 | 6/1993 |
| DE | 4330170 | 3/1995 |
| DE | 19708528 | 9/1997 |
| EP | 0061845 | 10/1982 |
| GB | 2235503 | 3/1991 |

* cited by examiner

*Primary Examiner*—Rodney H. Bonck
*Assistant Examiner*—Dennis Abdelnour
(74) *Attorney, Agent, or Firm*—Crowell & Moring LLP

(57) ABSTRACT

A change-speed gearbox has an input shaft connected to an output shaft by at least one first and one second component transmission, arranged parallel to one another in the power flow and each having a frictional power-shift clutch and an intermediate shaft. The intermediate shaft can be operatively connected to the input shaft by the power-shift clutch, with at least one gearbox constant per component transmission. Each gearbox constant has a gearwheel on one of the two intermediate shafts, at least one of which can be operatively connected to a first layshaft arranged parallel to the input shaft. At least one gearbox constant can be brought into an operative connection with the first and the second power-shift clutch.

22 Claims, 9 Drawing Sheets

Fig. 2

GEAR WHEEL VARIABLE TRANSMISSION WITH TWO SUB-GEARS ARRANGED PARALLEL TO EACH OTHER IN THE POWER FLOW

BACKGROUND OF THE INVENTION

This application claims the priority of PCT/EP99/10240 filed Dec. 21, 1999 and German patent document 198 60 2502, filed Dec. 24, 1998, the disclosures of which are expressly incorporated by reference herein.

The present invention relates to a change-speed gearbox with two component transmissions arranged parallel to one another in the power flow.

The manual gearboxes with a friction clutch that predominate in motor vehicles are simple and robust but have the disadvantage that an interruption in the tractive effort occurs during gear changes. Although conventional automatic transmissions with a hydrodynamic converter avoid an interruption in the tractive effort during gear changes, they are less efficient than manual gearboxes owing to the converter. Moreover, they are heavier and more costly.

In the case of change-speed gearboxes with two frictional power-shift clutches and two component transmissions arranged parallel to one another in the power flow, gear changes can be performed under load, and more specifically with overlapping control of the power-shift clutches. This makes it possible to achieve economical automatic transmissions with good efficiency. In general, the even-numbered gears are assigned to one component transmission and the uneven-numbered gears are assigned to the other component transmission, with the result that it is possible to perform sequential gear changes under load but it is not readily possible to skip individual gears, referred to as double upshifting or double downshifting.

U.S. Pat. No. 4,658,663 has disclosed a change-speed gearbox of the generic type. In this change-speed gearbox, an input shaft is connected to an output shaft by a first and a second component transmission, which are arranged parallel to one another in the power flow and each have a frictional power-shift clutch. Concentrically arranged intermediate shafts of the component transmissions can be connected to the input shaft by the power-shift clutches. The intermediate shafts can be operatively connected to the output shaft by means of gearbox constants, of a common layshaft arranged parallel to the input shaft and of gearwheel pairs. The gearwheel pairs for forward gears I, III, and IV and the gearwheel pair for the reverse gear belong to the first component transmission. The fourth gear is designed as a direct gear and can be selected by engaging a selector element between the output shaft and the intermediate shaft of the first component transmission.

The gearwheel pairs of forward gears II and V and an additional gearwheel pair, the transmission ratio of which is equal to the transmission ratio of third gear, the gearwheel pair of which belongs to the first component transmission, belong to the second component transmission. In the first component transmission, a gearwheel clutch for third gear and the direct clutch for fourth gear are combined to give a changing clutch with a common sliding selector sleeve, which can be coupled to a loose wheel of the gearwheel pair for third gear or to the output shaft.

Although all double downshifts and double upshifts are possible without an interruption in torque transmission in this change-speed gearbox, the gear changes from the direct fourth gear to first and third gear, the gearwheel pairs of which likewise belong to the first component transmission, require the temporary engagement of the additional gearwheel pair of third gear. To start off from first gear, the first power-shift clutch of the first component transmission is always used, as a result of which there is increased wear on the latter compared with the second power-shift clutch.

SUMMARY OF THE INVENTION

An object on which the invention is based is to develop a change-speed gearbox, in particular to reduce the effort involved in its construction, its costs and weight and increase efficiency. According to the invention, it is achieved by the features of the independent claims. Further refinements will become apparent from the subclaims.

The invention starts from a change-speed gearbox in which an input shaft is connected to an output shaft by at least one first and one second component transmission, which are arranged parallel to one another in the power flow. Each component transmission has a frictional power-shift clutch and an intermediate shaft, it being possible in each case for the intermediate shaft to be operatively connected to the input shaft by means of the power-shift clutch. The change-speed gearbox furthermore has at least one gearbox constant per component transmission, each gearbox constant having a gearwheel on one of the two intermediate shafts, at least one of which gears can be operatively connected to a first layshaft arranged parallel to the input shaft.

It is proposed that at least one gearbox constant can be brought into operative connection with the first and the second power-shift clutch. Power can advantageously be output to a layshaft by both power-shift clutches via at least one gearbox constant. With a certain number of gearwheel pairs, it is possible to achieve a particularly large number of power-shift options and, in particular, to achieve at least the most important double upshifts and double downshifts under load without additional gearwheel pairs. If at least one gearwheel of the gearbox constants on an intermediate shaft is embodied as a loose wheel and can be brought into operative connection with the first power-shift clutch by means of at least one selector element and with the second power-shift clutch by means of a selector element or, preferably, can be connected directly by means of a respective selector element to one intermediate shaft in each case, a gearbox constant can be brought into operative connection with the first and the second power-shift clutch in a manner that is particularly simple in terms of construction and economical in terms of space and with a high efficiency and low losses due to tooth engagements.

Further degrees of freedom with respect to various gear change options can furthermore be achieved if the gearwheel of the first gearbox constant on the first intermediate shaft and the gearwheel of the second gearbox constant on the second intermediate shaft are embodied as loose wheels. It is furthermore possible to achieve a situation where both power-shift clutches can be closed in all gears.

If at least the gearbox constant assigned to the lowest gear can be brought into operative connection with the first and the second power-shift clutch, either the first, the second or both power-shift clutches can advantageously be used for the purpose of starting off. The stresses resulting from the starting-off operation can be distributed between both power-shift clutches. Despite economical dimensioning, it is possible to avoid an excessive temperature, to reduce wear and extend service intervals. If one power-shift clutch fails, the second power-shift clutch can furthermore be used for starting off from first gear and reliability of mobility can be increased.

The power-shift clutches can also be designed differently for different starting-off operations and/or be used individually or jointly for starting off from a higher gear. The power-shift clutches are advantageously used individually or jointly for starting off as a function of at least one operating parameter, e.g. as a function of loading, friction, temperature and/or wear etc. detected at the power-shift clutches.

It is furthermore proposed that the power-shift clutch of the first component transmission can be brought into operative connection with a second layshaft parallel to the input shaft by means of the first gearbox constant, which shaft can be brought into operative connection with the output shaft by at least one gearwheel pair assigned to the first component transmission. An additional torque path can be created by means of the additionally engageable second layshaft. If, in particular, the output shaft can be connected to the intermediate shaft of the first component transmission by an engageable and disengageable selector element to form a direct gear, it is advantageously possible to create three torque paths between the input shaft and the output shaft. The torque paths can be used alternately and, in particular, a double downshift from the direct gear and a double upshift to the direct gear under load are made possible without an additional gearwheel pair.

In a refinement of the invention, it is proposed that the direct gear is the highest gear. Good efficiency can be achieved, in particular, when travelling on ordinary roads and motorways at high speeds. Losses due to tooth engagements can be avoided.

A particularly space-saving change-speed gearbox with a small number of gearwheel pairs and a large number of power-shift options, in particular double upshift and double downshift options under load, can be achieved if the gearbox constants are different from one another and at least one gearbox constant can be brought into operative connection with the output shaft by means of both layshafts. If at least two gearbox constants are operatively connected to each layshaft, each gearwheel pair can particularly advantageously be brought into operative connection with at least two gearbox constants. Each gearwheel pair can be assigned at least two gears or, in the case of more than two gearbox constants, more than two gears.

In various embodiments that may appear appropriate to the person skilled in the art, the gearbox constants can be connected to both layshafts. However, this can be achieved in a particularly space-saving and economical manner with two layshafts that are arranged concentrically to one another and can be operatively connected to one another by a selector element. At the same time, the selector element is advantageously arranged in a space-saving manner at the end of the second layshaft adjacent to the power-shift clutches.

The solution according to the invention, that at least one gearbox constant can be brought into operative connection with both power-shift clutches, and the solution according to the invention, that at least one layshaft can be brought into operative connection with both gearbox constants, each independently contributes to an increase in the power-shift options and in efficiency, to elimination of gearwheel pairs and to allowing not only sequential shifts under load but also double upshifts and double downshifts under load. Although these solutions are employed independently of one another, they are particularly advantageously employed jointly in a change-speed gearbox.

In a refinement, it is proposed that a gearwheel pair assigned to the first component transmission and a gearwheel pair assigned to the second component transmission are assigned to the next-smallest gear to the direct gear, thereby, in particular, making possible double downshifts and double upshifts to and from this gear and load. A double downshift from the next-smallest gear to the direct gear is often required for overtaking and is regarded as an important shifting operation.

The gear change from first to second gear often takes place under a high load. To allow a particularly comfortable gear change, one gearwheel pair is advantageously assigned to the lowest and the second-lowest gear. In a neutral position, the selector elements for the second gear can be preselected, thus making it possible, after starting off from first gear, to change from first to second gear simply by overlapping control of the power-shift clutches.

In another refinement, it is furthermore proposed that the gearwheel pair of the gearwheel pairs assigned to the forward gears is arranged nearest to a shaft mounting for the output shaft in a gearbox casing. Bending of the shafts and wear can be reduced.

In order to achieve close spacing of the shafts and hence a small overall volume of the gearbox and a low weight, one gearwheel for the highest gear is advantageously arranged on the layshaft that has a larger diameter than the other layshaft. The large diameter can advantageously be used for multiplication. Close spacing of the shafts and a low overall volume can furthermore be achieved if selector elements of the component transmissions are arranged in an axially offset manner. An unnecessarily large shaft spacing due to the selector elements can be avoided.

In an advantageous refinement for a wide range of applications, there are, in addition to the two gearbox constants, three gearwheel pairs for six different forward gears and one gearwheel pair for at least one reverse gear. One gearwheel of the gearwheel pair assigned to fourth and sixth gear is arranged on the second layshaft, and one gearwheel of the gearwheel pair assigned to third and fourth gear and one gearwheel of the gearwheel pair assigned to first and second gear are arranged on the first layshaft.

An advantageous variant furthermore comprises arranging one gearwheel of the gearwheel pair assigned to third and sixth gear on the second layshaft and one gearwheel of the gearwheel pair assigned to second and fourth gear and one gearwheel of the gearwheel pair assigned to first and second gear on the first layshaft. It is advantageously possible to achieve progressive graduation of the change-speed gearbox and/or a first gear with a large reduction, e.g. for use in the case of an internal combustion engine with a turbocharger, in the case of an internal combustion engine with a low power and/or in the case of an off-road vehicle etc.

An advantageous graduation of the gears, especially a large difference in the transmission ratio between second and fourth gear and/or with a progressive characteristic can be achieved in a space-saving manner if at least one gearwheel for a fourth gear and one gearwheel for a first and a second gear are arranged on the first layshaft, and at least one gearwheel for a sixth gear and one gearwheel for a third gear are arranged on a second layshaft. In this case, a large number of power-shift options and degrees of freedom for a particular graduation of the gears can be achieved if the gearwheels on the second layshaft for third and sixth gear are each embodied as loose wheels and can be operatively connected to the second layshaft by means of a common selector element. In the case of second to sixth gear, in particular, both power-shift clutches can furthermore be closed. Losses, especially those due to drag torque and wear, especially at a thrust bearing of a crankshaft and a release bearing of the power-shift clutches can be reduced and service life can be extended.

Other objects, advantages and novel features of the present invention will become apparent from the following detailed description of the invention when considered in conjunction with the accompany in a drawings.

BRIEF DESCRIPTION OF THE DRAWINGS

FIG. 2 is an overview of possible gear changes with correspondingly selected selector elements.

DETAILED DESCRIPTION OF THE DRAWINGS

Figure 1:
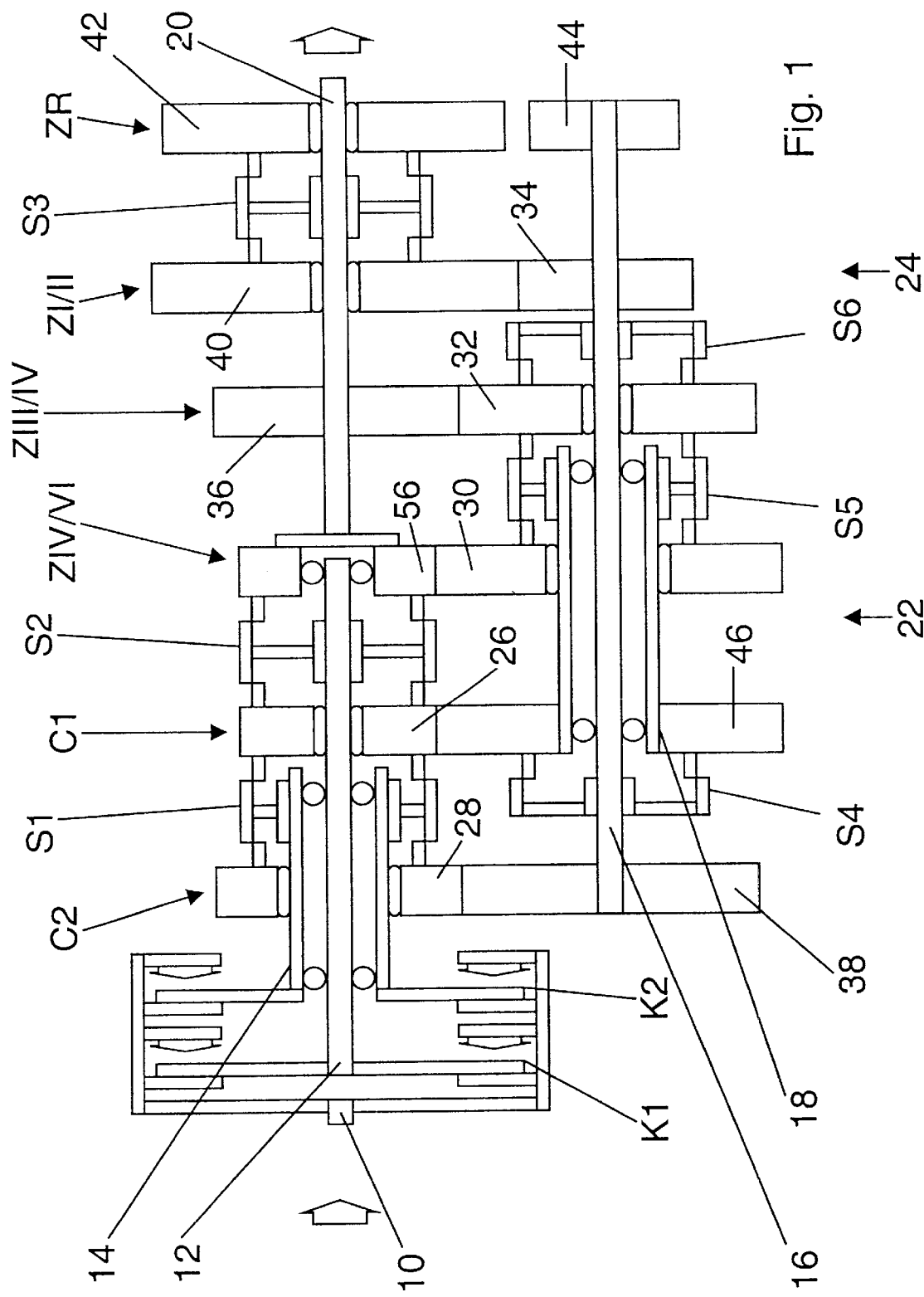
FIG. 1 is a schematic diagram of a change-speed gearbox.

FIG. 1 shows a change-speed gearbox according to the invention, in which an input shaft 10 is connected to an output shaft 20 by a first component transmission 22 and a second component transmission 24, which are arranged parallel to one another in the power flow. Each of the component transmissions 22, 24 has a frictional power-shift clutch K1, K2 and an intermediate shaft 12, 14. The intermediate shafts 12, 14 are arranged concentrically to one another and coaxially to the input shaft 10 and can each be operatively connected to the input shaft 10 by means of the power-shift clutch K1, K2.

The first intermediate shaft 12 of the first component transmission 22 can be operatively connected, on the one hand, to the output shaft 20 by an engageable and disengageable gearwheel clutch S2 to form a direct fifth gear V and, on the other hand, to a layshaft 18 embodied as a hollow shaft parallel to the output shaft 20 by gearwheel clutch S2 via a first gearbox constant C1.

The layshaft 18 of the first component transmission 22 is connected to the output shaft 20 by a gearwheel pair ZIV/VI to form the highest and second-highest gear IV, VI. The second layshaft 18 has a larger diameter than the first layshaft 16. The large diameter is advantageously used for multiplication, in particular for the highest gear VI.

Gearwheel pair ZIV/VI has a fixed wheel 56, which is connected in a rotationally fixed manner to the output shaft 20 and meshes with a loose wheel 30. The loose wheel 30 is arranged concentrically and rotatably on the layshaft 18 and can be coupled to the layshaft 18 by an engageable and disengageable gearwheel clutch S5. Intermediate shaft 12 is supported in fixed wheel 56, thereby making it possible, in particular, to cut down the overall length.

The layshaft 18 of the first component transmission 22 can furthermore be operatively connected to the output shaft 20 by means of a gearwheel pair ZIII/IV to form third and fourth gear III, IV. Gearwheel pair ZIII/IV has a fixed wheel 36, which is arranged concentrically and in a rotationally fixed manner on the output shaft 20, and a loose wheel 32, which is arranged concentrically and rotatably on another layshaft 16 parallel to the output shaft 20. The loose wheel 32 can be coupled to layshaft 18 by means of engageable and disengageable gearwheel clutch S5 and to layshaft 16 with a gearwheel clutch S6.

The second intermediate shaft 14 of the second component transmission 24, which is designed as a hollow shaft, is connected by a second gearbox constant C2 to layshaft 16, which passes through the layshaft 18 of the first component transmission 22 with a clearance. The second gearbox constant C2 has a loose wheel 28, which is arranged concentrically and rotatably on intermediate shaft 14 and can be coupled to intermediate shaft 14 by means of a gearwheel clutch S1, and a fixed wheel 38, which is connected concentrically and in a rotationally fixed manner to layshaft 16. The layshaft 16 belonging to the second component transmission 24 is connected to the output shaft 20 by means of the gearwheel pair ZIII/IV for third and fourth gear III, IV, by means of a gearwheel pair ZI/II for first and second gear I, II and by means of a gearwheel pair ZR for two reverse gears R. One reverse gear can be designed for operation in winter, for example, and one reverse gear can be designed for operation in summer, for example. The gearwheel pair ZI/II for first and second gear I, II has a loose wheel 40, which is arranged concentrically and rotatably on the output shaft 20 and can be coupled to the output shaft 20 by means of a gearwheel clutch S3, and a fixed wheel 34, which is arranged concentrically and in a rotationally fixed manner on layshaft 16.

The gearwheel pair ZR for the reverse gears R has a loose wheel 42, which is arranged concentrically and rotatably on the output shaft 20 and can be coupled to the output shaft 20 by engageable and disengageable gearwheel clutch S3, and a fixed wheel 44, which is connected concentrically and in a rotationally fixed manner to layshaft 16. A gearwheel (not shown specifically) is arranged between the loose wheel 42 and the fixed wheel 44 of gearwheel pair ZR to reverse the direction of rotation.

The first gearbox constant C1 has a fixed wheel 46, which is arranged concentrically and in a rotationally fixed manner on layshaft 16 and meshes with a loose wheel 26, which is arranged concentrically and rotatably on the intermediate shaft 12 of the first component transmission 22. The loose wheel 26 can be connected to the intermediate shaft 12 of the first component transmission 22 by engageable and disengageable gearwheel clutch S2 and to the intermediate shaft 14 of the second component transmission 24 by gearwheel clutch S1. The second power-shift clutch K2 and the second intermediate shaft 14 can thereby be operatively connected not only to the second gearbox constant C2 but also to the first gearbox constant C1. The first gearbox constant C1 can be brought into operative connection with either the first, the second or both power-shift clutches K1, K2 by gearwheel clutches S1 and S2.

The intermediate shaft 14 of the second component transmission 24 can furthermore be operatively connected via the second gearbox constant C2, by an engageable and disengageable gearwheel clutch S4, to the fixed wheel 46 of gearbox constant C1 and hence to the layshaft 18 of the first component transmission 22 and, via the gearwheel pair ZIV/VI assigned to the first component transmission 22, to the output shaft 20. Gearwheel clutch S4 is arranged at the end of the second layshaft 18 adjacent to the power-shift clutches K1, K2. Intermediate shaft 12 can be operatively connected via the first gearbox constant C1, advantageously by engageable and disengageable gearwheel clutch S4, to layshaft 16 and, via the gearwheel pairs ZIII/IV, ZI/II, ZR assigned to the second component transmission 24, to the output shaft 20. Power can be output to the output shaft 20 with each gearbox constant C1 and C2 via each gearwheel pair ZI/II, ZIII/IV, ZIV/VI, ZR. Gearbox constants C1 and C2 are different, and each gearwheel pair ZI/II, ZIII/IV, ZIV/VI, ZR is thus associated with two gears.

Figure 2:
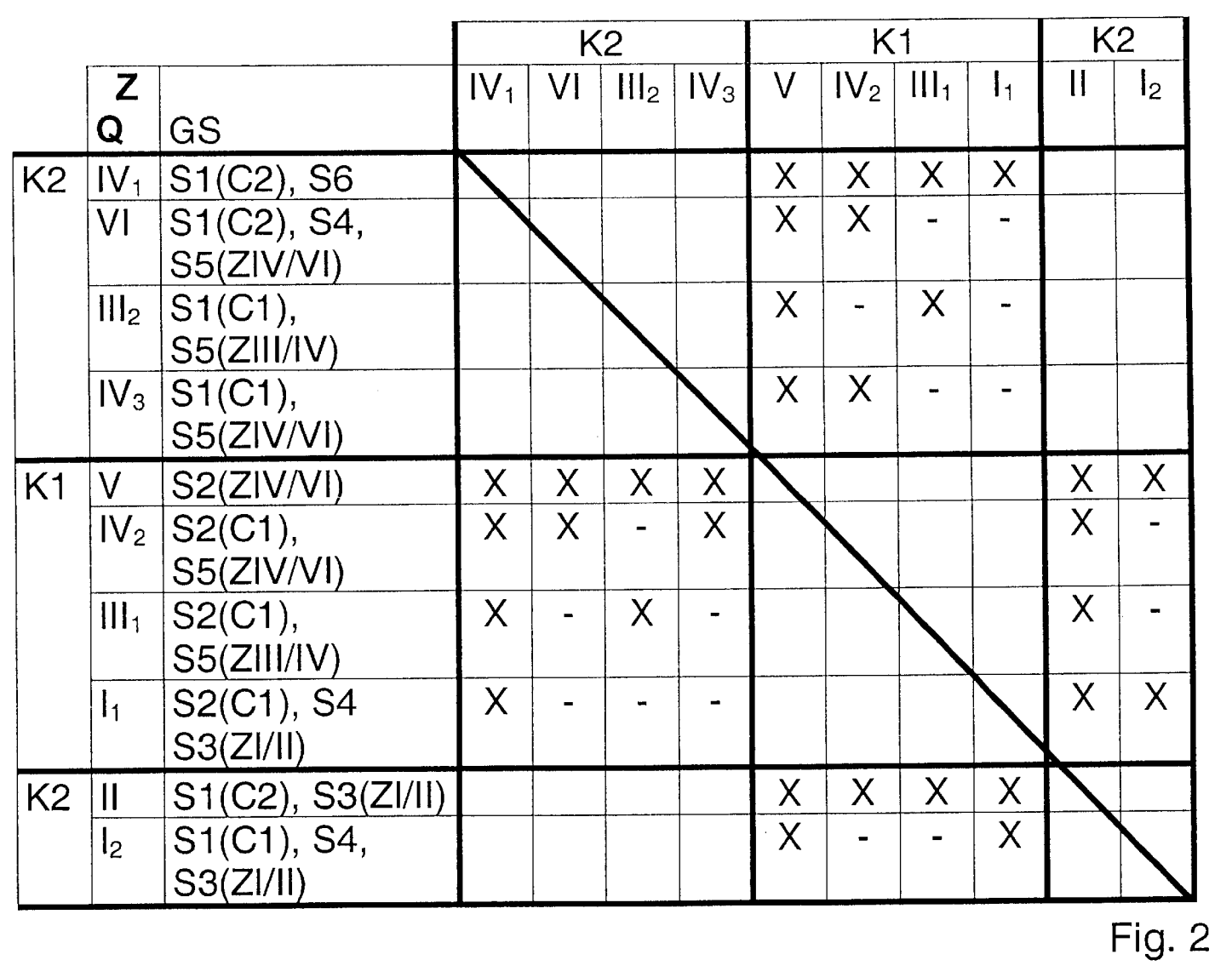

FIG. 2 shows an overview of possible gear changes under load, in each case from a source gear Q to a target gear Z. The possible gear changes are indicated by X. The selected gearwheel clutches are listed under GS. If two selection positions of the gearwheel clutch are possible in addition to a neutral position, the coupled gearbox constant or the coupled gearwheel pair are in each case given for the gearwheel clutch. With the two gearbox constants C1 and C2 and the three gearwheel pairs ZI/II, ZIII/IV, ZIV/VI, six different forward gears I, II, III, IV, V, VI can be achieved, first gear $I_{1,2}$ occurring twice, third gear $III_{1,2}$ occurring twice and fourth gear $IV_{1,2,3}$ occurring three times.

Gear Change $I_1$–II

When starting off from first gear $I_1$ with the first power-shift clutch K1, gearwheel clutch S2 couples the loose wheel 26 of the first gearbox constant C1 to intermediate shaft 12, gearwheel clutch S4 couples the fixed wheel 46 of the first gearbox constant C1 to layshaft 16, and gearwheel clutch S3 couples the loose wheel 40 of gearwheel pair ZI/II to the output shaft 20. The power flows from the input shaft 10, via the first power-shift clutch K1, intermediate shaft 12, gearwheel clutch S2, gearbox constant C1, gearwheel clutch S4, layshaft 16, gearwheel pair ZI/II and gearwheel clutch S3 to the output shaft 20.

Gearwheel clutch S1 advantageously couples the loose wheel 28 of the second gearbox constant C2 to intermediate shaft 14 even before starting off from first gear $I_1$ or in a neutral position of the change-speed gearbox, making it possible to change from first to second gear $I_1$–II under load merely by an overlapping switch from power-shift clutch K1 to power-shift clutch K2 or simultaneous disengagement of the first and engagement of the second power-shift clutch K2. In second gear II, the power flows from the input shaft 10, via the second power-shift clutch K2, intermediate shaft 14, gearwheel clutch S1, gearbox constant C2, layshaft 16, gearwheel pair ZI/II and gearwheel clutch S3 to the output shaft 20. The gearwheel clutches S2 and S4 can be disengaged under no load in second gear II.

Gear Change II–$III_1$

To change from second to third gear $III_1$, the loose wheel 26 of gearbox constant C1 is coupled to intermediate shaft 12 by gearwheel clutch S2, and the loose wheel 32 of gearwheel pair ZIII/IV is coupled to layshaft 18 by gearwheel clutch S5. With an overlapping switch from power-shift clutch K2 to power-shift clutch K1, a power shift from second to third gear II–$III_1$ is performed. In third gear $III_1$, the power flows from the input shaft 10, via the first power-shift clutch K1, intermediate shaft 12, gearwheel clutch S2, gearbox constant C1, layshaft 18, gearwheel clutch S5 and gearwheel pair ZIII/IV to the output shaft 20. The gearwheel clutches S1 and S3 can be disengaged under no load.

Gear Change $III_1$–$IV_1$

To change from third to fourth gear $III_1$–$IV_1$, the loose wheel 28 of gearbox constant C2 is coupled to intermediate shaft 14 by gearwheel clutch S1, and the loose wheel 32 of gearwheel pair ZIII/IV is coupled to layshaft 16. With an overlapping switch from power-shift clutch K1 to power-shift clutch K2, a power shift from third to fourth gear $III_1$–$IV_1$ is performed. In fourth gear $IV_1$, the power flows from the input shaft 10, via the second power-shift clutch K2, intermediate shaft 14, gearwheel clutch S1, gearbox constant C2, layshaft 16, gearwheel clutch S6 and gearwheel pair ZIII/IV to the output shaft 20. The gearwheel clutches S2 and S5 can be disengaged under no load.

Gear Change $IV_1$–V

To change from fourth gear $IV_1$ to fifth gear V, intermediate shaft 12 is coupled to the fixed wheel 56 of gearwheel pair ZIV/VI and hence to the output shaft 20 by gearwheel clutch S2. With an overlapping switch from power-shift clutch K2 to power-shift clutch K1, a power shift from fourth to fifth gear $IV_1$–V is performed. In fifth gear V, the power flows from the input shaft 10, via the first power-shift clutch K1, intermediate shaft 12, gearwheel clutch S2, and the fixed wheel 56 of gearwheel pair ZIV/VI to the output shaft 20. The gearwheel clutches S1 and S6 can be disengaged under no load.

Gear Change V–VI

To change from fifth to sixth gear V–VI, the loose wheel 28 of gearbox constant C2 is coupled to intermediate shaft 14 by gearwheel clutch S1, layshaft 16 is coupled to the fixed wheel 46 of gearbox constant C1 by gearwheel clutch S4, and the loose wheel 30 of gearwheel pair ZIV/VI is coupled to layshaft 18 by gearwheel clutch S5. By means of an overlapping switch from power-shift clutch K1 to power-shift clutch K2, a power shift from fifth to sixth gear V–VI is performed. In sixth gear VI, the power flows from the input shaft 10, via the second power-shift clutch K2, intermediate shaft 14, gearwheel clutch S4, layshaft 18, gearwheel clutch S5 and gearwheel pair ZIV/VI to the output shaft 20. The gearwheel clutch S2 can be disengaged under no load.

In a manner corresponding to the sequential upshift from first to sixth gear $I_1$–VI, it is possible to power-shift down sequentially from sixth to first gear VI–$I_1$.

Reverse Gear R

In a reverse gear R, power-shift clutch K2 is closed and gearwheel clutch S1 couples the loose wheel 28 of gearbox constant C2 to intermediate shaft 14, and gearwheel clutch S3 couples the loose wheel 42 of gearwheel pair ZR to the output shaft 20. The power flows from the input shaft 10 via power-shift clutch K2, intermediate shaft 14, gearwheel clutch S1, gearbox constant C2, layshaft 16, gearwheel pair ZR and gearwheel clutch S3 to the output shaft 20. In addition, it is also possible to select a second reverse gear with gearbox constant C1.

Gear Change $I_{1,2}$–II

Instead of using the first power-shift clutch K1 alone, it is also possible to start off from first gear $I_2$ jointly with the first and second power-shift clutch K2 or even with the second power-shift clutch K2 alone. When starting off from first gear $I_{1,2}$ using both power-shift clutches K1, K2, both power-shift clutches K1, K2 are closed. Gearwheel clutch S1 couples intermediate shaft 14 and gearwheel clutch S2 couples intermediate shaft 12 to the loose wheel 26 of gearbox constant C1. Gearwheel clutch S4 couples gearbox constant C1 to layshaft 16 and gearwheel clutch S3 couples loose wheel 40 of gearwheel pair ZI/II to the output shaft 20. The power flows from the input shaft 10, via the power-shift clutches K1, K2, via the intermediate shafts 12, 14, via the gearwheel clutches S1, S2, gearbox constant C1, gearwheel clutch S4, layshaft 16, gearwheel pair ZI/II and gearwheel clutch S3 to the output shaft 20. If the differential speed in the power-shift clutches K1, K2 falls to zero, power-shift clutch K2 is opened.

If the second power-shift clutch K2 alone is used for starting off from first gear I$_2$, it is possible to change to second gear II without interrupting the tractive effort by transferring to power-shift clutch K1 or directly to second gear II with an interruption in the tractive effort.

Gear Change II–IV$_2$, IV$_2$–II

To perform a double upshift from second to fourth gear II–IV$_2$, the loose wheel 26 of gearbox constant C1 is coupled to intermediate shaft 12 by gearwheel clutch S2, and the loose wheel 30 of gearwheel pair ZIV/VI is coupled to layshaft 18 by gearwheel clutch S5. By means of an overlapping switch from power-shift clutch K2 to power-shift clutch K1, a power shift from second to fourth gear II–IV$_2$ can be performed. In fourth gear IV$_2$, the power flows from the input shaft 10, via the first power-shift clutch K1, intermediate shaft 12, gearwheel clutch S2, gearbox constant C1, layshaft 18, gearwheel clutch S5 and gearwheel pair ZIV/VI to the output shaft 20. The gearwheel clutches S1 and S3 can be disengaged under no load. A downward power shift from fourth gear IV$_2$ to second gear II can be performed in a corresponding manner.

After changing up from second to fourth gear II–IV$_2$, it is possible to perform a power shift to fifth gear V via either of two different fourth gears IV$_{1,3}$, in which the second power-shift clutch K2 is in each case closed. The power-shift clutch K2 is closed not only in the two fourth gears IV$_{1,2}$ already described but also in the remaining fourth gear IV$_3$. Gearwheel clutch S1 couples the loose wheel 26 of gearbox constant C1 to intermediate shaft 14, and gearwheel clutch S5 couples the loose wheel 30 of gearwheel pair ZIV/VI to layshaft 18. The power flows from the input shaft 10 via the second power-shift clutch K2, intermediate shaft 14, gearwheel clutch S1, gearbox constant C1, layshaft 18, gearwheel clutch S5 and gearwheel pair ZIV/VI to the output shaft 20.

Gear Change IV$_2$–VI, VI–IV$_2$

To perform an upshift from fourth gear IV$_{1,3}$ to sixth gear VI, a power shift is first of all performed to fourth gear IV$_2$—if the latter is not already selected—in which the first power-shift clutch K1 is closed. By means of an overlapping switch from power-shift clutch K1 to K2, an upshift can then be performed under load from fourth gear IV$_2$ to sixth gear VI. A downshift under load from sixth gear VI to fourth gear IV$_2$ can be performed in a corresponding manner.

It is possible to perform a power shift from each of gears IV$_1$ and IV$_3$ to fourth gear IV$_2$ and vice versa. From gear IV$_1$, a power shift to IV$_3$ can be performed via IV$_2$ and, from IV$_3$, a power shift to IV$_1$ can be performed via IV$_2$. Before changing from fourth gear IV$_{1,2,3}$ to a target gear, fourth gear IV$_{1,2,3}$, from which it is possible to power-shift to the target gear, is always chosen.

Gear Change III$_2$–V, V–III$_2$

To change from third gear III$_1$ to fifth gear V, a power shift to third gear III$_2$ is first of all performed. The loose wheel 26 of the first gearbox constant C1 is coupled to intermediate shaft 14 by gearwheel clutch S1. By means of an overlapping switch from power-shift clutch K1 to power-shift clutch K2, a power shift is then performed from third gear III$_1$ to third gear III$_2$. In third gear III$_2$, the power flows from the input shaft 10 via the second power-shift clutch K2, intermediate shaft 14, gearwheel clutch S1, gearbox constant C1, layshaft 18, gearwheel clutch S5 and gearwheel pair ZIII/IV to the output shaft 20. Gearwheel clutch S2 can be disengaged under no load. A power shift to fifth gear V can then be performed.

A power shift from fifth gear V to third gear III$_2$ and from third gear III$_2$ to third gear III$_1$ can be performed in a corresponding manner.

In addition to the gear changes described, it is possible to change from IV$_1$ to I$_1$, from V to IV$_3$, II and I$_2$, from I to IV$_1$ and I$_2$, from II to V and from I$_2$ to V.

Figure 3:
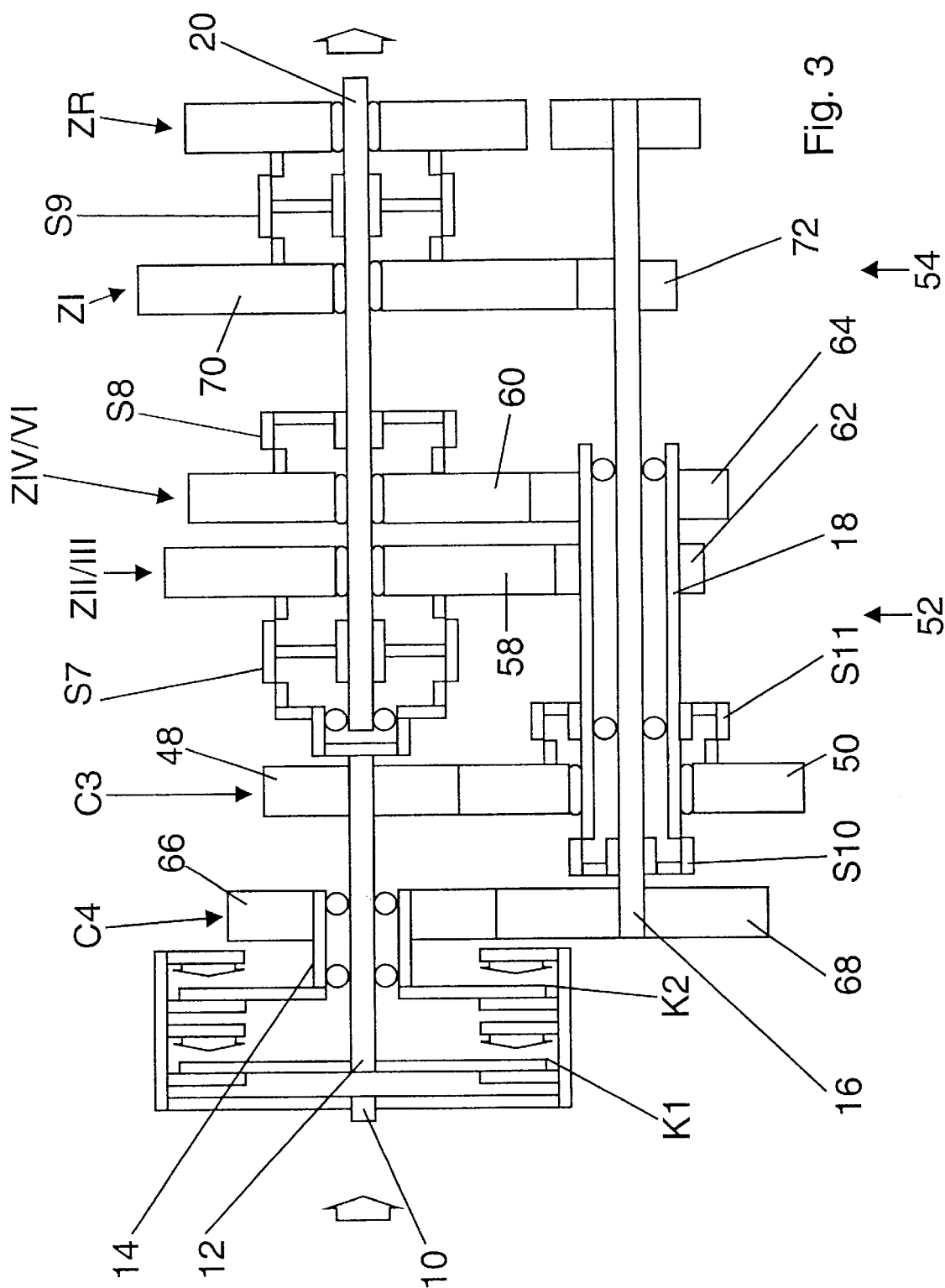
FIG. 3 is a variant schematic in accordance with FIG. 1.

FIG. 3 shows a variant in accordance with FIG. 1. Components that are essentially the same are all provided with the same references. The input shaft 10 and the output shaft 20 are connected by two component transmissions 52, 54, which are arranged parallel to one another in the power flow.

The first intermediate shaft 12 of the first component transmission 52 can be operatively connected, on the one hand, to the output shaft 20 by an engageable and disengageable gearwheel clutch S7 to form a direct fifth gear V and, on the other hand, to layshaft 18, which is embodied as a hollow shaft parallel to the output shaft 20, via a first gearbox constant C3 by means of a gearwheel clutch S11. The first gearbox constant C3 has a fixed wheel 48, which is arranged concentrically and in a rotationally fixed manner on intermediate shaft 12 and meshes with a loose wheel 50 arranged concentrically and rotatably on layshaft 18.

The layshaft 18 of the first component transmission 52 is connected to the output shaft 20 by a gearwheel pair ZII/III and a gearwheel pair ZIV/VI. Gearwheel pairs ZII/III, ZIV/VI each have a loose wheel 58, 60, which is mounted concentrically and rotatably on the output shaft 20 and meshes with fixed wheels 62, 64 arranged on layshaft 18. Loose wheel 58 can be coupled to the output shaft 20 by gearwheel clutch S7, and loose wheel 60 can be coupled to the output shaft 20 by a gearwheel clutch S8.

The second intermediate shaft 14 of the second component transmission 54, which is designed as a hollow shaft, is connected by a second gearbox constant C4 to layshaft 16, which passes through the layshaft 18 of the first component transmission 52 with a clearance. The second gearbox constant C4 has a fixed wheel 66, which is arranged concentrically and in a rotationally fixed manner on intermediate shaft 14 and a fixed wheel 68, which is arranged concentrically and in a rotationally fixed manner on layshaft 16.

The layshaft 16 belonging to the second component transmission 54 is connected to the output shaft 20 by gearwheel pair ZI and a gearwheel pair ZR.

The gearwheel pair ZI for first gear I has a loose wheel 70, which is arranged concentrically and rotatably on the output shaft 20 and can be coupled to the output shaft 20 by means of a gearwheel clutch S9, and a fixed wheel 72, which is arranged concentrically and in a rotationally fixed manner on layshaft 16.

The intermediate shaft 14 of the second component transmission 54 can be operatively connected to the layshaft 18 of the first component transmission 52 via the second gearbox constant C4 by an engageable and disengageable gearwheel clutch S10 and to the output shaft 20 by means of the gearwheel pairs ZII/III, ZIV/VI assigned to the first component transmission 52. Intermediate shaft 12 can advantageously be operatively connected to layshaft 16 via the first gearbox constant C3 by the engageable and disengageable gearwheel clutch S10 and to the output shaft 20 by means of the gearwheel pairs ZI, ZR assigned to the second component transmission 54. Power can be output to the output shaft 20 with each gearbox constant C3 and C4 via each gearwheel pair ZI, ZIV/VI, ZII/III and ZR. The gearbox constants C3 and C4 are different, with the result that the gearwheel pairs ZII/III, ZIV/VI are each assigned to two gears II, III and IV, VI. Gearwheel pair ZI is associated only with first gear I, thereby advantageously allowing the latter to be chosen independently of any other gear and to be matched specifically to a particular area of application of the change-speed gearbox.

Further exemplary embodiments are illustrated in FIGS. 4 to 9. Differences with respect to the exemplary embodiments in FIGS. 1 and 3 already described will be described below. As regards components and functions that are the same, reference can be made to the description of the exemplary embodiments in FIGS. 1 and 3.

Figure 4:
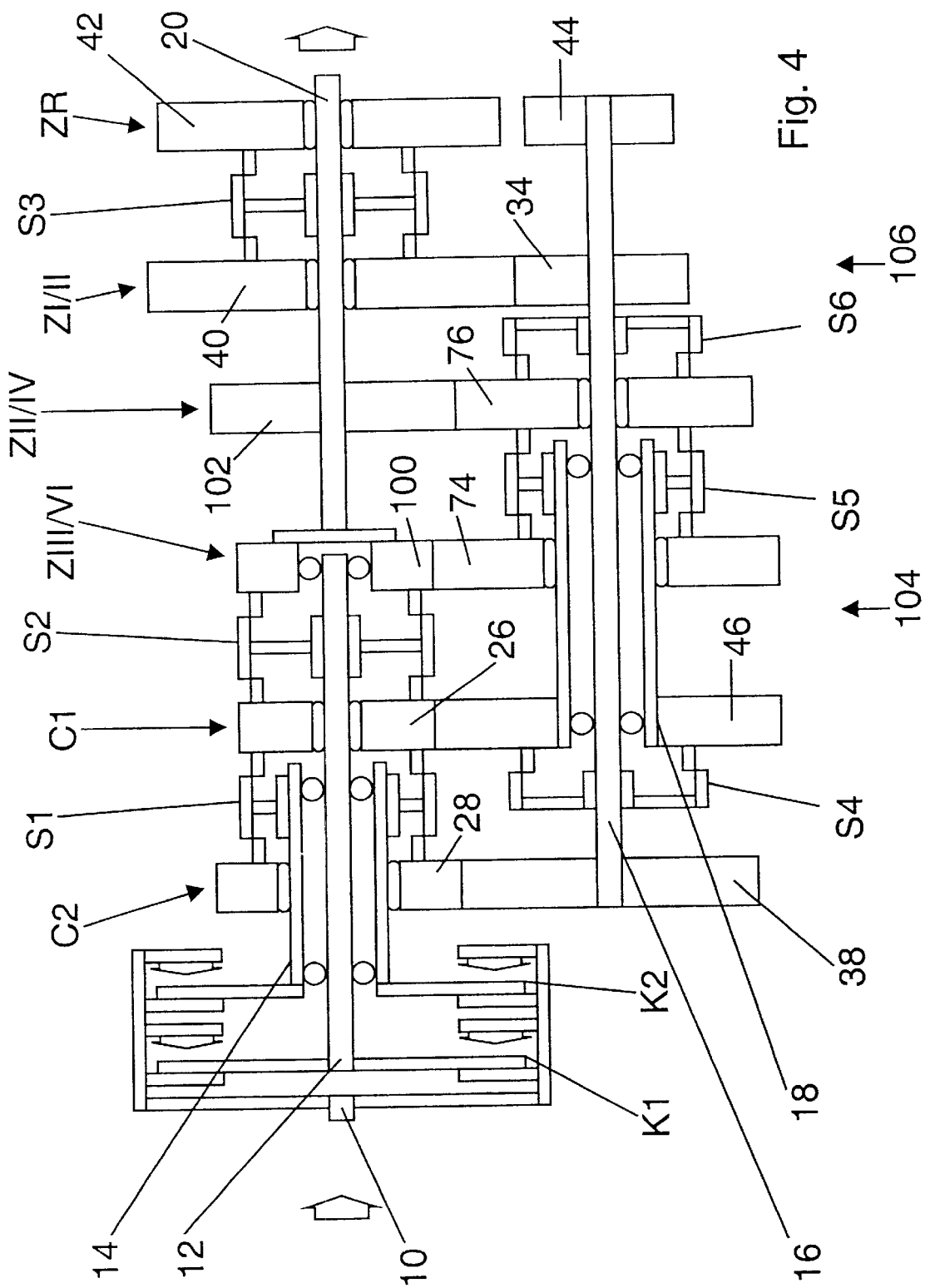
FIG. 4 is a variant schematic in accordance with FIG. 1 with a different association between gearwheel pairs and gears.

The exemplary embodiment in FIG. 4 has two component transmissions 104, 106 with a different association between the gears I–VI and the gearwheel pairs ZI/II, ZII/IV, ZIII/VI from that in the exemplary embodiment in FIG. 1, there being namely, in addition to the two gearbox constants C1, C2, three gearwheel pairs ZI/II, ZII/IV, ZIII/VI for six different forward gears I, II, III, IV, V, VI and a gearwheel pair ZR for at least one reverse gear R, one gearwheel 74 of the gearwheel pair ZIII/VI associated with third and sixth gear III, VI being arranged on the second layshaft 18 and one gearwheel 76 of the gearwheel pair ZII/IV associated with second and fourth gear II, IV and one gearwheel 34 of the gearwheel pair ZI/II associated with first and second gear I, II being arranged on the first layshaft 16. The gearwheels 74 and 76 are embodied as loose wheels. Both gearwheels 74, 76 can be coupled to the second layshaft 18 by means of the gearwheel clutch S5 arranged concentrically on the second layshaft 18, and gearwheel 76 can furthermore be coupled to the first layshaft 16 by means of gearwheel clutch S6. The gearwheels 74, 76 mesh with fixed wheels 100, 102 arranged on the output shaft 20.

Figure 5:
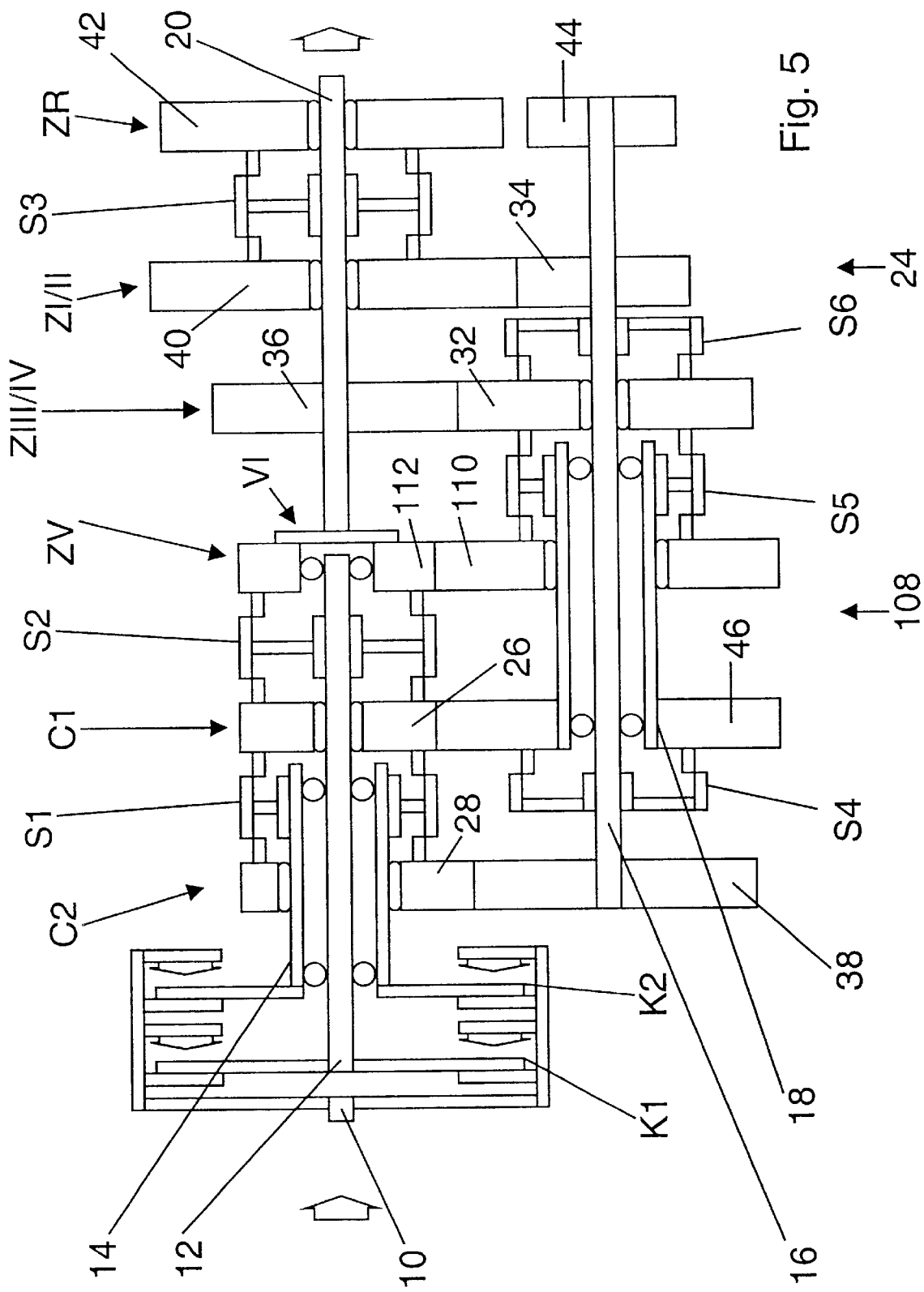
FIG. 5 is a variant schematic in accordance with FIG. 1 with a sixth, direct, gear.

In the exemplary embodiment in FIG. 5, in contrast to that in FIG. 1, the highest gear, that is sixth gear VI, is embodied as a direct gear. The input shaft 10 is here connected to the output shaft 20 via gearwheel clutch S2. The change-speed gearbox has a component transmission 108 with a gearwheel pair ZV for a fifth gear V, which has a loose wheel 110 arranged on the second layshaft 18 and a fixed wheel 112 arranged on the output shaft 20. Like loose wheel 30 in FIG. 1, loose wheel 110 can be coupled to the second layshaft 18 by means of gearwheel clutch S5.

Figure 6:
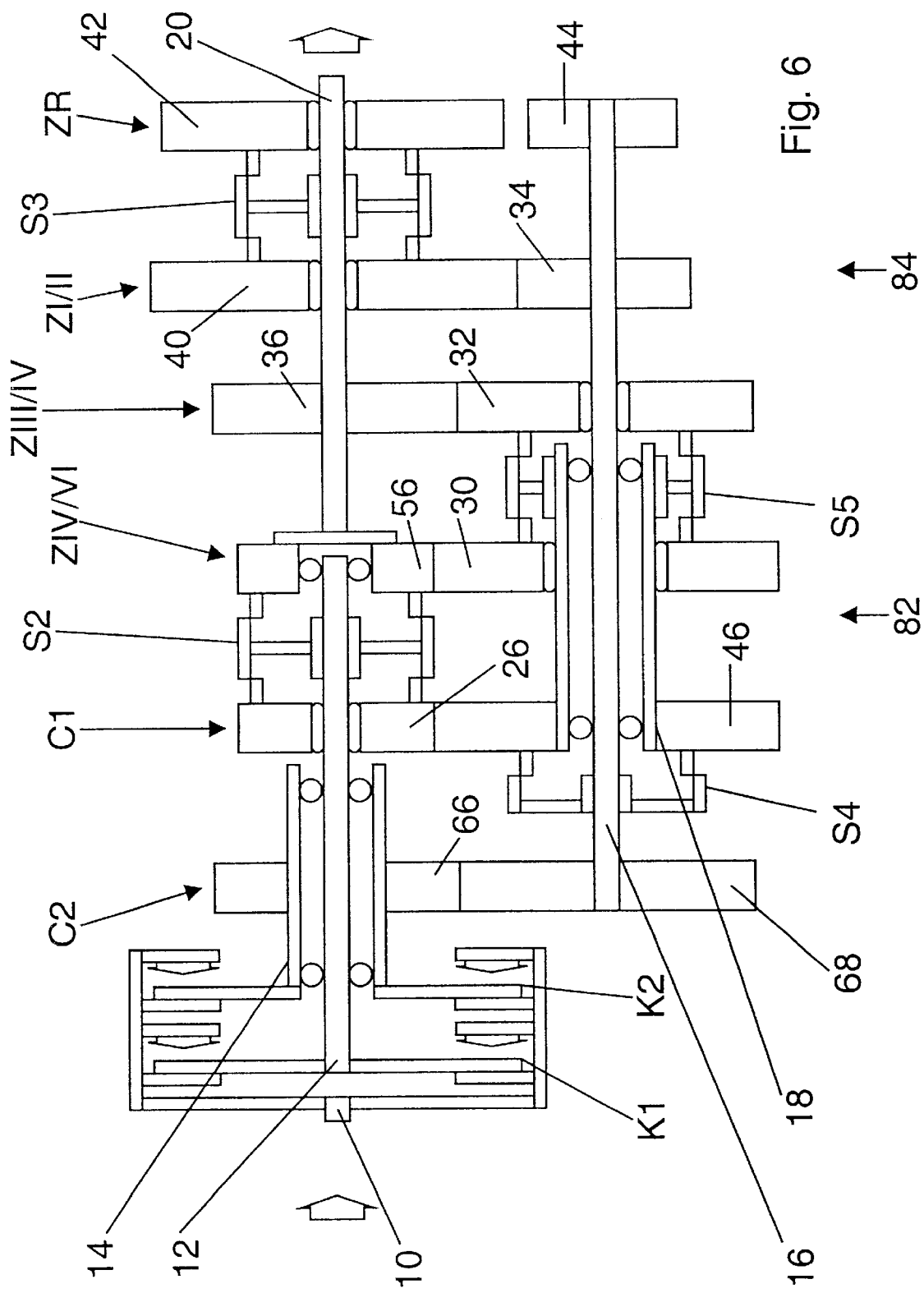
FIG. 6 is a variant schematic in accordance with FIG. 1 with selector elements arranged in an offset manner.

The exemplary embodiment in FIG. 6 has two component transmissions 82, 84 with selector elements S2, S3, S4, S5 arranged in an offset manner, and, more specifically, in comparison with the exemplary embodiment in FIG. 1, gearwheel clutches S1 and S6 have been omitted, with the result that the change-speed gearbox is of particularly small construction axially and radially. Gearbox constant C2, like gearbox constant C4 in FIG. 3, has two fixed wheels 66, 68. The allocation of the gearwheel pairs ZI/II, ZIII/IV, ZVI/VI to gears I–VI corresponds to that in FIG. 1.

Figure 7:
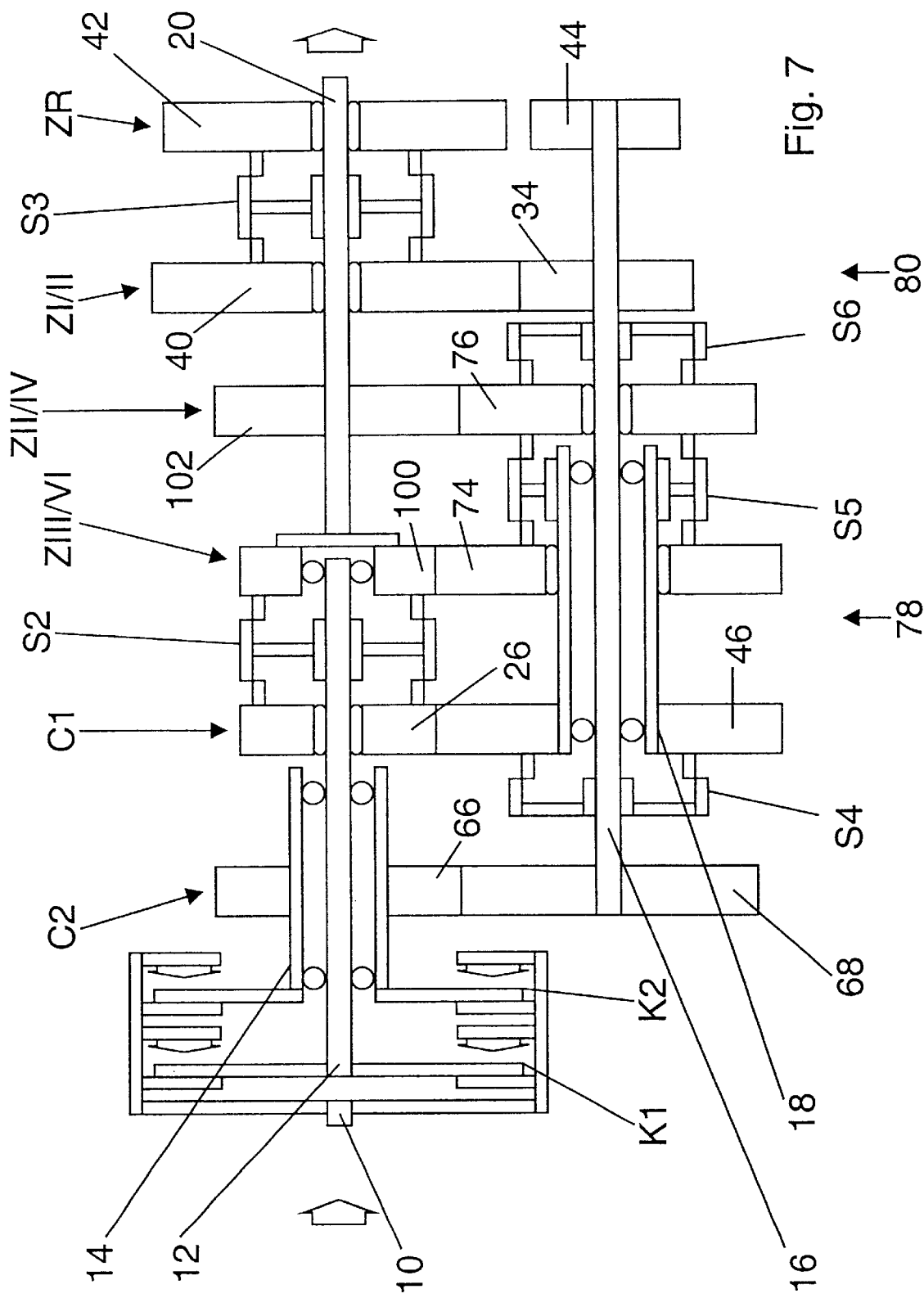
FIG. 7 is a variant schematic in accordance with FIG. 6 with a different association between gearwheel pairs and gears.

FIG. 7 shows a change-speed gearbox with two component transmissions 78, 80 with gearwheel clutches S2, S3, S4, S5, S6 arranged in an offset manner. In comparison with the change-speed gearbox in FIG. 1, gearwheel clutch S1 has been omitted. Like gearbox constant C4 in FIG. 3, gearbox constant C2 has two fixed wheels 66, 68. The allocation of the gearwheel pairs ZI/II, ZII/IV, ZIII/VI to gears I–VI corresponds to that in FIG. 4.

Figure 8:
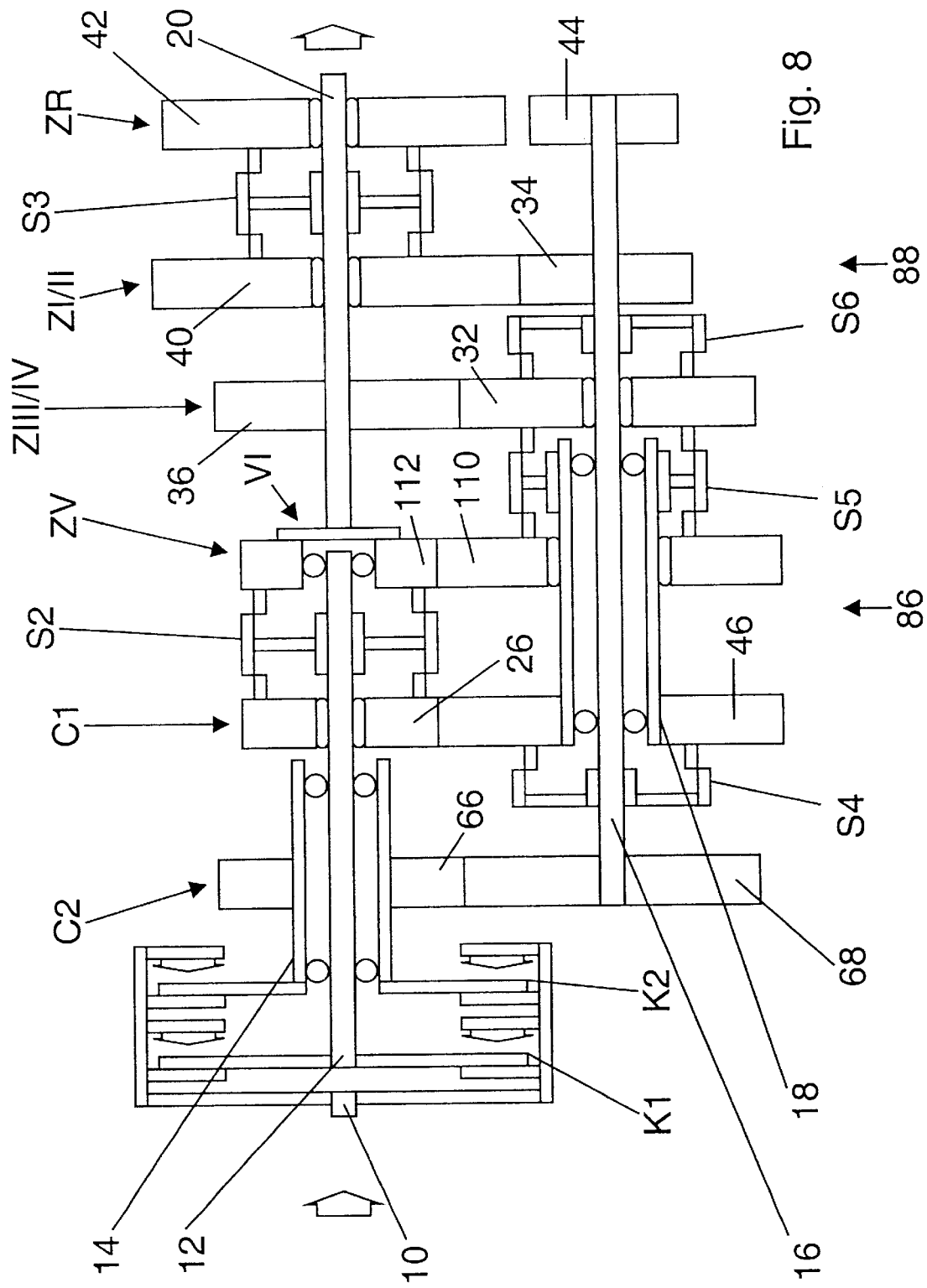
FIG. 8 is a variant schematic in accordance with FIG. 6 with a sixth, direct, gear.

FIG. 8 shows a change-speed gearbox with two component transmissions 86, 88, the gearwheel clutches S2, S3, S4, S5, S6 of which are arranged in a manner corresponding to the change-speed gearbox in FIG. 7. The allocation of the gearwheel pairs ZI/II, ZIII/IV, ZV corresponds to that in FIG. 5. The highest gear VI is embodied as a direct gear VI.

Figure 9:
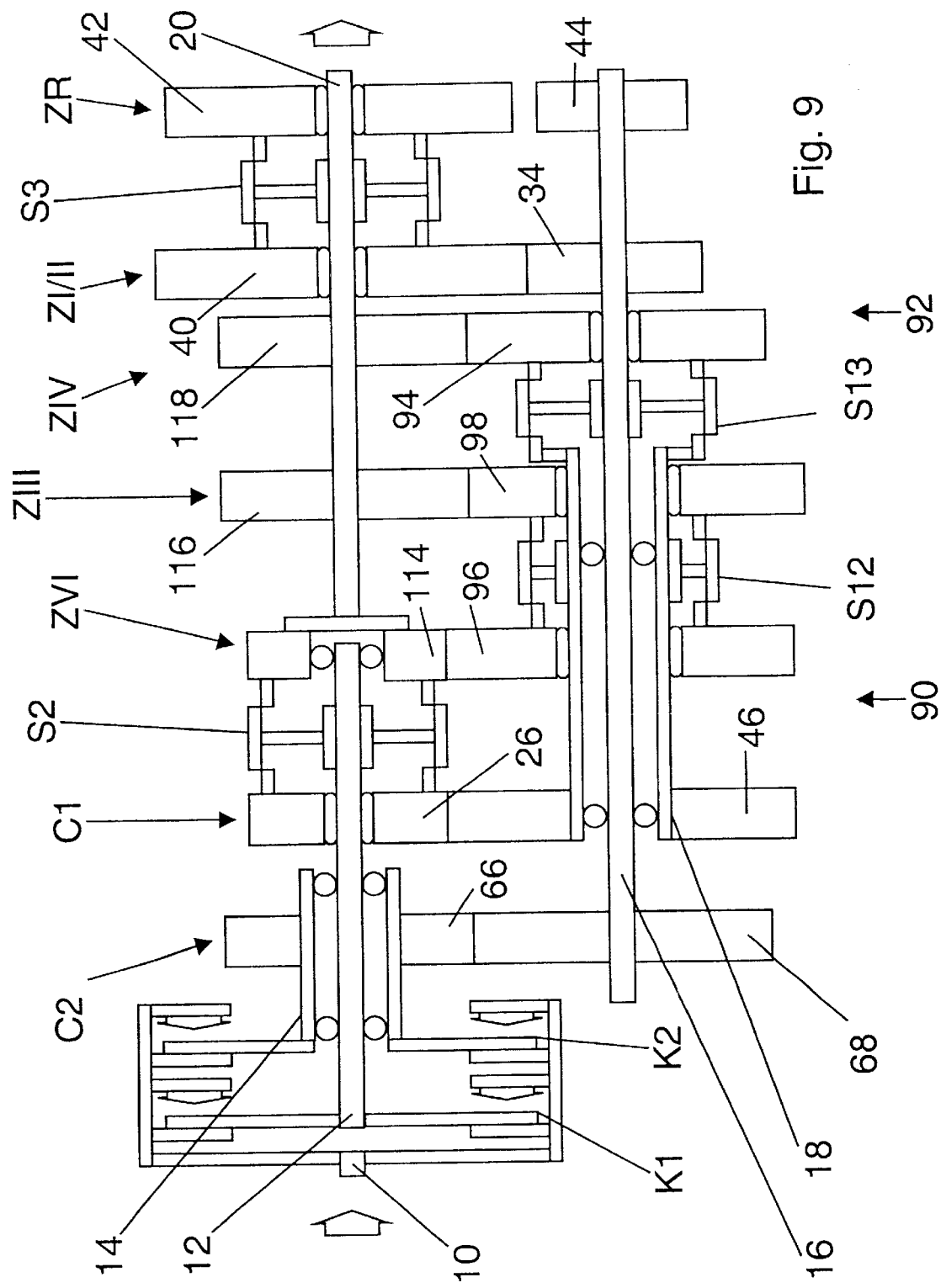
FIG. 9 is a variant schematic in accordance with FIG. 1 with four selectable gearwheel pairs for six forward gears.

The exemplary embodiment illustrated in FIG. 9 has a component transmission 92 with a gearwheel 94 for fourth gear IV arranged on the first layshaft 16 and a gearwheel 34 for first and second gear I, II. The change-speed gearbox furthermore has a component transmission 90 with a gearwheel 96 for sixth gear VI arranged on the second layshaft 18 and a gearwheel 98 for third gear III. Component transmission 90 has two gearwheel pairs ZIII, ZVI for third and sixth gear III, VI, and component transmission 92 has a gearwheel pair ZI/II for first and second gear I, II and a gearwheel pair ZIV for fourth gear IV.

The gearwheels 96, 98 on the second layshaft 18 for third and sixth gear III, VI are each embodied as a loose wheel and can be operatively connected to the second layshaft 18 by means of a common selector element S12. The gearwheels 96, 98 each mesh with one fixed wheel 114, 116 arranged on the output shaft 20.

Arranged on the first layshaft 16, between the second layshaft 18 and gearwheel pair ZIV, is a gearwheel clutch S13, by means of which the first layshaft 16 can be coupled to the second layshaft 18 and the loose wheel 94 of gearwheel pair ZIV, which is arranged on the first layshaft 16, can be coupled to the first layshaft 16. The loose wheel 94 meshes with a fixed wheel 118 arranged on the output shaft 20. As compared with the change-speed gearbox in FIG. 1, gearwheel clutches S1, S4, S5 and S6 are omitted, and gearwheel clutches S4 and S6 (FIG. 1) are combined to give the space-saving gearwheel clutch S13. Like gearbox constant C4 in FIG. 3, gearbox constant C2 has two fixed wheels 66, 68. The gearbox constants C1, C2 are arranged at a small axial spacing, thereby saving axial installation space. The selector elements S2, S3, S12, S13 are arranged axially offset, thereby saving radial installation space. Three free gears can be used for multiple shifts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Change-speed gearbox, in which an input shaft is connected to an output shaft by at least one first and one second component transmission arranged parallel to one another in a power flow circuit and each have a frictional power-shift clutch and an intermediate shaft, each of the intermediate shafts being operatively connectable to the input shaft by the power-shift clutch, and with at least one gearbox constant per component transmission, each gearbox constant having a gearwheel on one of the two intermediate shafts, at least one of which gears is operative to be operatively connected to a first layshaft arranged parallel to the input shaft, wherein at least one gearbox constant is operative to be brought into operative connection with the first and the second power-shift clutch.

2. Change-speed gearbox according to claim 1, wherein at least one gearwheel of a gearbox constant on an intermediate shaft is a loose wheel and is operative to be brought into operative connection with the first power-shift clutch by at least one selector element and with the second power-shift clutch by a selector element.

3. Change-speed gearbox according to claim 2, wherein the gearwheel of the first gearbox constant on the first intermediate shaft and the gearwheel of the second gearbox constant on the second intermediate shaft are loose wheels.

4. Change-speed gearbox according to claim 1, wherein at least the gearbox constant associated with the lowest gear is operative to be brought into operative connection with the first and the second power-shift clutch.

5. Change-speed gearbox according to claim 4, wherein the first power-shift clutch and the second power-shift clutch are operative to be brought individually or jointly into operative connection with the output shaft by the gearbox constant associated with the lowest gear for starting off.

6. Change-speed gearbox according to claim 1, wherein power-shift clutch of the first component transmission is operative to be brought into operative connection with a second layshaft parallel to the input shaft by the first gearbox constant, the second layshaft being operative to be brought into operative connection with the output shaft by at least one gearwheel pair associated with the first component transmission.

7. Change-speed gearbox according to claim 6, wherein the output shaft is operative to be connected to at least one intermediate shaft of a component transmission by at least one engageable and disengageable selector element to form a direct gear.

8. Change-speed gearbox according to claim 7, wherein the direct gear is the highest gear.

9. Change-speed gearbox according to claim 6, wherein the gearbox constants are different from one another and at least one gearbox constant is operative to be brought into operative connection with the output shaft by both layshafts.

10. Change-speed gearbox according to claim 6, wherein a gearwheel pair for a reverse gear is operative to be brought into operative connection with at least two gearbox constants.

11. Change-speed gearbox according to claim 10, wherein each gearwheel pair is operative to be brought into operative connection with at least two gearbox constants.

12. Change-speed gearbox according to claim 6, wherein the layshafts are arranged concentrically are arranged to be operatively connected to one another by at least one selector element.

13. Change-speed gearbox according to claim 12, wherein the selector element is arranged at end of the second layshaft adjacent to the power-shift clutches.

14. Change-speed gearbox according to claim 1, wherein a gearwheel pair associated with the first component transmission and a gearwheel pair associated with the second component transmission are associated with the next-smallest gear to the direct gear.

15. Change-speed gearbox according to claim 1, wherein one gearwheel pair is associated with the lowest and the second-lowest gear.

16. Change-speed gearbox according to claim 15, wherein the gearwheel pair of the gearwheel pairs associated with the forward gears is operatively arranged nearest to a shaft mounting for the output shaft in a gearbox casing.

17. Change-speed gearbox according to claim 1, wherein a gearwheel for the highest gear is arranged on a second layshaft, having a diameter larger than the first layshaft.

18. Change-speed gearbox according to claim 1, wherein selector elements of the component transmissions are arranged in an axially offset manner.

19. Change-speed gearbox according to claim 1, further comprising in addition to the two gearbox constants, three gearwheel pairs for six different forward gears and one gearwheel pair for at least one reverse gear, and one gearwheel of the gearwheel pair associated with fourth and sixth gear is operatively arranged on a second layshaft, and one gearwheel of the gearwheel pair associated with third and fourth gear and one gearwheel of the gearwheel pair associated with first and second gear are operatively arranged on the first layshaft.

20. Change-speed gearbox according to claim 1, further comprising in addition to the two gearbox constants, three gearwheel pairs for six different forward gears and one gearwheel pair for at least one reverse gear, and one gearwheel of the gearwheel pair associated with third and sixth gear is operatively arranged on a second layshaft, and one gearwheel of the gearwheel pair associated with second and fourth gear and one gearwheel of the gearwheel pair associated with first and second gear are operatively arranged on the first layshaft.

21. Change-speed gearbox according to claim 1, wherein at least one gearwheel for a fourth gear and one gearwheel for a first and a second gear are operatively arranged on the first layshaft, and at least one gearwheel for a sixth gear and one gearwheel for a third gear are operatively arranged on a second layshaft.

22. Change-speed gearbox according to claim 21, wherein gearwheels on the second layshaft for third and sixth gear are configured as loose wheels and are operatively connected to the second layshaft by a common selector element.

* * * * *